Figure 5:
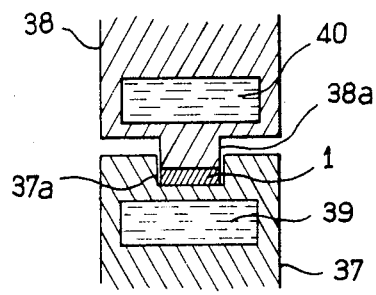

United States Patent [19]

Chabrier et al.

[11] Patent Number: 4,626,306
[45] Date of Patent: Dec. 2, 1986

[54] PROCESS FOR MANUFACTURING PROFILED STRIPS IN FIBER-LOADED THERMOPLASTIC RESIN, INSTALLATION FOR THE IMPLEMENTATION THEREOF AND PROFILED STRIPS OBTAINED

[75] Inventors: Gilbert Chabrier, Montmorency; Guy Moine, Domont; Roger Maurion, Montigny les Cormeilles; René Szabo, Le Peco, all of France

[73] Assignees: Spie-Batignolles, Puteaux; Coflexip, Paris, both of France

[21] Appl. No.: 819,481

[22] PCT Filed: Nov. 17, 1982

[86] PCT No.: PCT/FR82/00192
§ 371 Date: Jun. 20, 1983
§ 102(e) Date: Jun. 20, 1983

[87] PCT Pub. No.: WO83/01755
PCT Pub. Date: May 26, 1983

Related U.S. Application Data

[63] Continuation of Ser. No. 522,379, Jun. 20, 1983, abandoned.

[30] Foreign Application Priority Data

Nov. 18, 1981 [FR] France .............................. 81 21545

[51] Int. Cl.⁴ ............................................. B05D 1/24
[52] U.S. Cl. ..................................... 156/180; 118/57; 118/420; 156/73.6; 156/441; 427/174; 427/175; 427/182; 427/346

[58] Field of Search .............. 156/166, 441, 555, 283, 156/308.2, 398, 73.6, 180; 427/174, 175, 185, 374.4, 375, 388.4, 434.6, 346; 118/225, DIG. 5, 234, 420, 57; 264/136, 131, 134, 137, 174, 258, 271.1, 272.1, 263

[56] References Cited

U.S. PATENT DOCUMENTS

| | | | |
|---|---|---|---|
| 2,852,840 | 9/1958 | Harvey | 156/194 |
| 2,881,087 | 4/1959 | Schwartz et al. | 118/57 |
| 3,703,396 | 11/1972 | LaMarche et al. | 156/158 |
| 3,742,106 | 6/1973 | Price | 156/167 |
| 3,862,287 | 1/1975 | Davis | 156/180 |
| 3,897,533 | 7/1975 | Hani et al. | 264/137 |
| 3,940,464 | 2/1976 | Davis | 264/137 |
| 4,158,297 | 6/1979 | Winch | 68/22 R |

FOREIGN PATENT DOCUMENTS

| | | |
|---|---|---|
| 2031719 | 11/1970 | France . |
| 2031720 | 11/1970 | France . |
| 1259084 | 1/1972 | United Kingdom . |

*Primary Examiner*—Michael Ball
*Attorney, Agent, or Firm*—Young & Thompson

[57] ABSTRACT

The procedure for manufacturing thin profiled strips, made up of continuous unidirectional fibers embedded in a thermoplastic resin, consists of impregnating a lap (1) of parallel fibers with resin particles, achieving resin fusion, forming the profiled strip and of cooling the latter.

The lap (1) of fibers is dipped into a bath (26) of resin particles, mechanically impregnated with the particles, by feeding it for instance around rollers (15, 16, 17) immersed in the resin particles and the excess particles are removed to obtain the desired resin to fiber content ratio.

Use of profiled strips obtained, in particular for outwardly reinforcing tubes or for producing moulded items.

9 Claims, 6 Drawing Figures

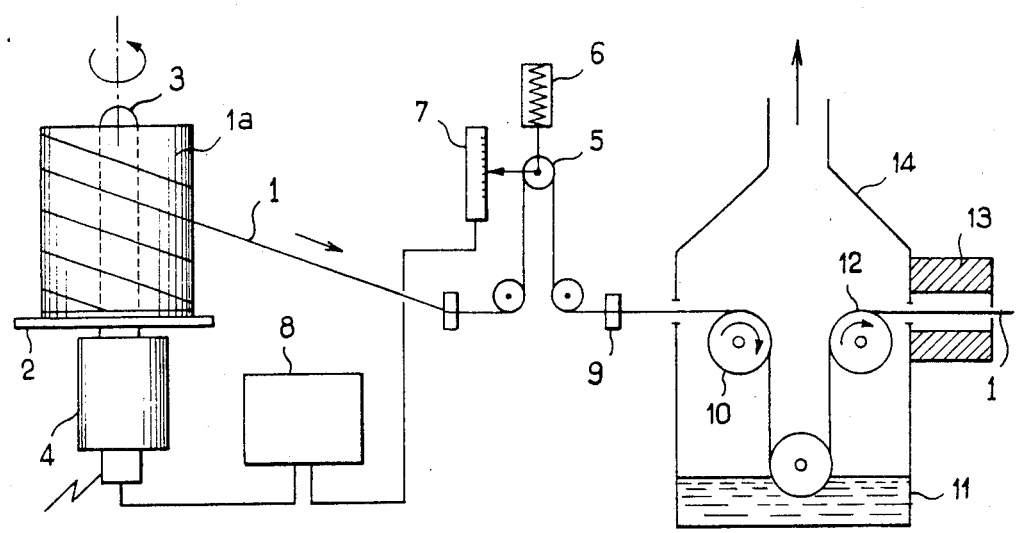
FIG_1
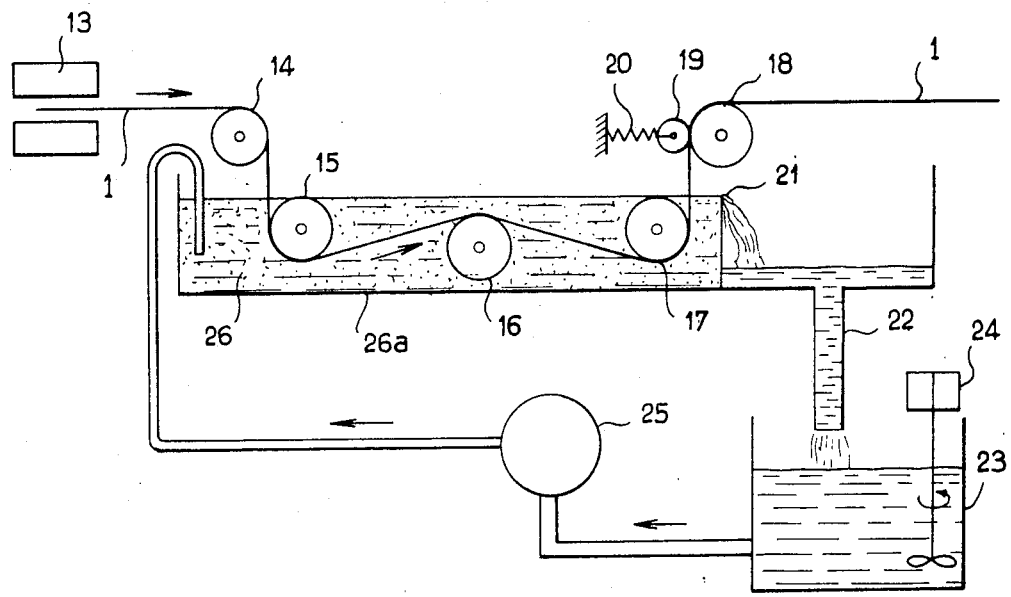
FIG_2

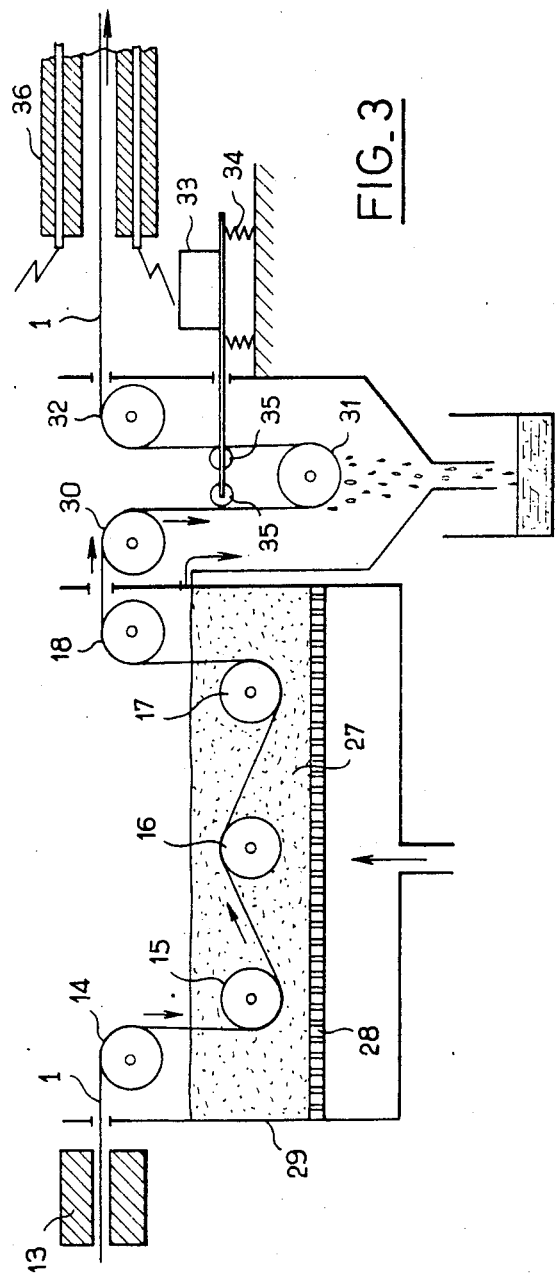
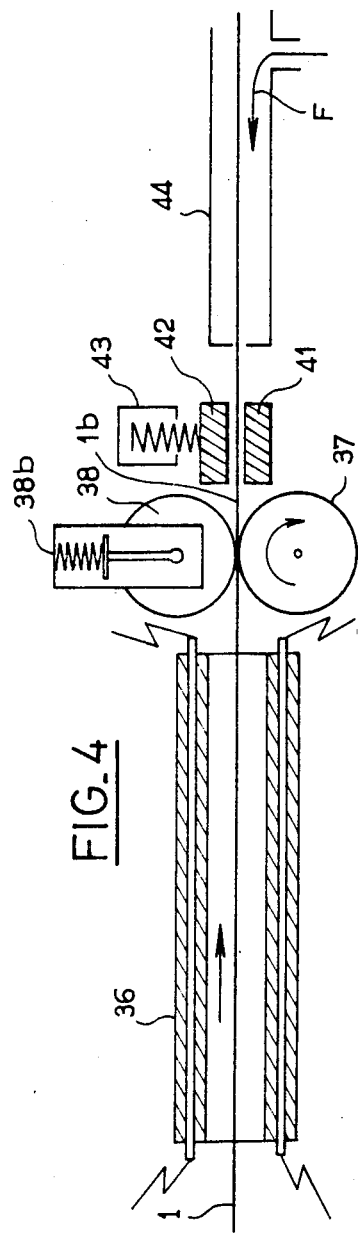
FIG. 3
FIG. 4

PROCESS FOR MANUFACTURING PROFILED STRIPS IN FIBER-LOADED THERMOPLASTIC RESIN, INSTALLATION FOR THE IMPLEMENTATION THEREOF AND PROFILED STRIPS OBTAINED

This application is a continuation of application Ser. No. 522,379, filed on 6/20/83, now abandoned.

The present invention relates to a process for manufacturing profiled strips having high mechanical performance properties, consisting of continuous unidirectional fibers embedded in a thermoplastic resin.

The invention further covers an installation for implementing this procedure and the profiled strips thereby obtained.

By way of an example, as in French Pat. No. 2,031,719, a procedure is known for obtaining profiled strips composed of agglomerated fibers using powder-based synthetic resins and intended primarily for producing long-fiber granules.

This process consists of separating out all the fibers initially in strand or slubbing form, of coating these individual fibers with a synthetic resin in powder form and, immediately after coating, of inducing resin fusion followed by the forming and cooling of the product.

The fibers are separated from each other by introducing the fiber slubbing into a venturi through which a fluid flows at high speed. The fibers thus taken apart then pass under a powder-based synthetic resin feeder and the thus impregnated fibers then run through a heated die from which a sectional form is delivered comprised of agglomerated fibers in a synthetic resin.

The drawbacks of this procedure are manifold. Indeed, there is no way of governing the resin distribution inside the fibers.

Granted that the resin spread between the fibers cannot be uniform and that the aforementioned procedure provides no way of obtaining high fiber content, these profiled strips offer rather low tensile strength, well under 100 hbars when using type E glass fibers.

The object of the present invention is to overcome the drawbacks of the aforesaid process.

In the process covered by the invention, a lap of parallel fibers is impregnated with resin particles, the resin is then melted, the profiled strip formed and the latter finally cooled.

In accordance with the invention, this process is characterized in that a lap of parallel and equally-taut fibers is composed starting from several untwisted fiber slubbings. The lap of fibers is dipped in a bath of resin particles, mechanically impregnated with the particles and any excess of particles is then removed to achieve the desired resin content.

Preferably, the lap of fibers can be mechanically impregnated with the resin particles by feeding the lap over rollers immersed in the resin particles and by adjusting the contact pressure of the lap on the rollers such that the resin particles are mechanically forced through the fibers by the rollers. It has been noted that the resin particle impregnation of the lap could thus be perfectly controlled thereby obtaining a very uniform distribution therein.

By way of a variant, this mechanical impregnation can be achieved by other means, such as centrifuging, ultra-sonic methods, etc.

As a result of this procedure, profiled strip can be produced having a fiber content of at least 50% and preferably 70% by weight and a wide cross-section, where the tensile strength exceeds 100 hbars when use is made of type E glass fibers.

These high fiber content and high performance continuous profiled strips are particularly well suited to the wound reinforcement of hollow bodies (tubes or tanks as described in French patent application No. 80 20666 dated Sept. 26 1980, on behalf of Spie-Batignolles).

In a preferred embodiment of the invention, a lap of parallel and equally-taut fibers is made up from several slubbings of untwisted fibers whereupon the surface of the fibers is treated for adherence of the resin employed.

Consequently, excellent adherence of the resin on the fibers is obtained, even when the initial batching of the fibers is not compatible with the resin used.

In an advantageous embodiment of the invention, after resin fusion, the lap loaded with melted resin is cold formed by pinch passing it between two cooled cylinders. This operation provides a method of obtaining better results than feeding the lap through a die due to the high viscosity level of these resins when melted. Furthermore, by having cooled cylinders, it is possible to avoid clogging caused by the melted resin which adheres to the walls in the case of heated dies.

In a first version of the process the resin particles are in a state of aqueous dispersion.

In a further version of the process the resin particles are in a state of dense suspension in air or in a neutral gas.

The invention also relates to the installation for implementing the procedure in accordance with the invention.

This installation successively comprises:

means for outwardly unrolling fiber slubbings under a constant and adjustable tension and constituting a lap of parallel fibers distributed over a maximum of two layers, means for treating the surface of these fibers with a view to providing resin adherence therewith, a tub containing a constant level bath of resin particles, rollers for drawing the lap into the bath and for impregnating the lap with the particles, means for eliminating any excess particles in the lap, means for heating the lap loaded with particles beyond the resin fusion point, and means for forming the lap impregnated with the melted resin to the desired profile.

The profiled strip obtained per the procedure in accordance with the invention comprises at least 50% of glass fibers by weight embedded in a thermoplastic resin and offering a strength exceeding 100 hbars.

The fibers can be selected among the following materials: glass, asbestos, boron, carbon, graphite, kevlar and other fibers whose softening point is substantially higher than the melting point of the resin.

The resin can be made up of polyamide, polyvinyl chloride, polycarbonate or polyethylene powder or any other thermoplastic or thermosetting resin, or mixture of these resins.

Figure 6:
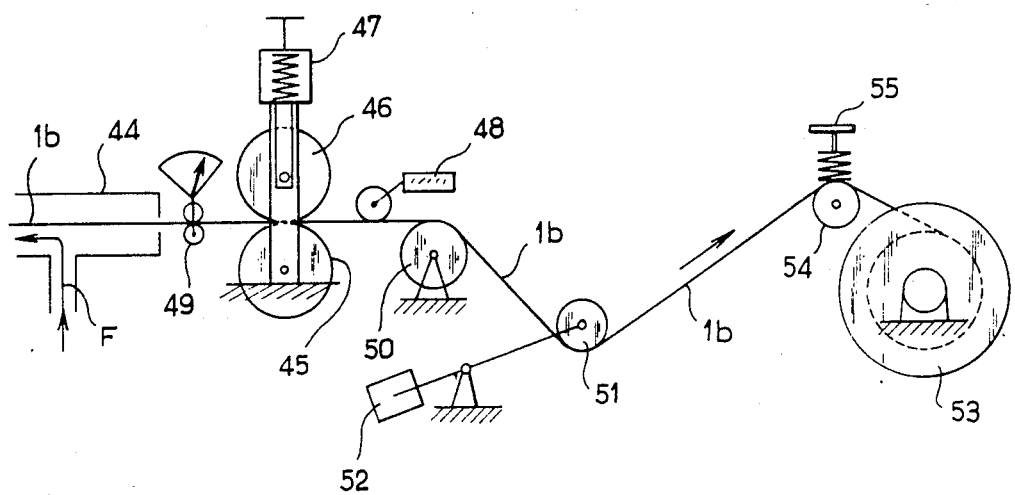

Other features and advantages of the invention will become apparent from the following description in relation to the drawings appended hereto, given as nonexhaustive examples, in which:

FIG. 1 schematizes the fiber lap production phase followed by the fiber treatment device;

FIG. 2 schematizes the phase where the lap is impregnated with the resin particles in aqueous dispersion;

FIG. 3 schematizes a variation of the impregnation phase where the lap is impregnated with resin particles in gaseous suspension;

FIG. 4 schematizes the heating and sizing of the lap for shaping it to the thin profiled form;

FIG. 5 is a schematic cross-sectional view, on a larger scale of the sizing module; and FIG. 6 schematizes the phase for storing the profiled strips on reels.

The modular construction principle adopted as regards developing the two installation assemblies described hereinafter, but not limited thereto, has enabled the various modules to be defined.

It goes without saying that, based on identical ideas, a compact and automated installation could be designed. In these two case examples, the installation may be broken down into the following modules:

A. Build up of the lap of parallel fibers and surface treatment of the fibers;
B. Lap impregnation and resin quantity dosage;
C. Heating and fusion;
D. Sizing and cooling; and
E. Drawing and coiling.

Only the second module differs in the two examples revealed. The two installations will therefore not be described separately, but rather a description of each module will be proffered successively.

A. LAP CREATION MODULE (SEE FIG. 1)

The clews or coils 1a of glass roving obtained by direct winding are unrolled from the outside to eliminate any twisting of the slubbing in the lap 1. They are engaged vertically on a plate 2 comprising an expandable fixing mandrel 3. The plate is driven by a variable speed dc motor 4. The vertical position of the coils places a limit on any imbalance in the event of ovalization of the coil, the actual weight of the coil having very little effect.

Upon leaving the coil, the lap of fibers 1 runs through a system of pulleys one of which 5 is movable and linked to a dynamometer 6. A cursor 7 connected to the movable pulley controls an electronic regulator 8 which duly slaves the motor speed in order to hold the desired tension. A safety system obviates any run-away in the motor should the roving jam. Each coil composing the lap is thus regulated, thereby guaranteeing an equal and controlled tension of all the rovings in the lap.

This device makes it possible to reach speeds of up to 90 m/minute.

Upon leaving the tension pulleys, each roving is fed through a wire-guide 9 and over a roller 10 which starts to separate out the fibers. The respective positions of the wire-guides and the rollers are set for obtaining a lap of parallel rovings sufficiently wide so that the fibers can be spread over a maximum of two thicknesses.

This spreading action is achieved by adjusting the unwinding tension. For the same width, this tension depends on the fiber oiling, which varies depending on their origin and sometimes on the manufacturing batch.

When the lap 1 leaves the roller 10, it runs around a roller impregnated with the treating solution 11 before being squeeze-dried on the roller 12. It is then dried by being fed between infra-red heating panels 13.

The solvent vapours from the treating solution 11 are drawn off by a hood 14 and treated in an installation not shown. p This re-oiling operation carried out on the fibers is necessary in order to ensure proper fiber adherence on the resin used because at the present time, the rovings available on the market are treated solely for impregnation with thermo-setting resins.

In the example described, the treating solution 11 chosen for applying a polyamide resin, consists of MEK with a 2% phenol epoxy in solution. Use may also be made of butanol with 1% silane in solution.

B. LAP IMPREGNATION AND RESIN DOSAGE

B1. Resin in Aqueous Dispersion (See FIG. 2)

The treated and dried lap 1 runs across the roller 14 into a tub 26a with an aqueous dispersion of resin 26. The substantially spheroid particles of resin are mechanically forced through the fibers upon passing around the rollers 15,16 and 17, immersed in the resin dispersion, as a result of the lap tension. By pressing the particles in between the fibers and due to the walls of the rollers 15,16 and 17, the fiber separation is enhanced and the fibers are held apart by the particles caught therein.

The rollers 15, 16 and 17 thus make it possible to impregnate mechanically the fiber lap with the resin. This impregnation can be regulated by modifying the following parameters: lap tension, roller rotational speed, number and diameter of the rollers, resin particle dimensions and fiber diameter. The essential point is to exert a sufficient tension on the fiber lap running around the rollers immersed in the resin for the resin particles trapped between the rollers and the lap to penetrate into the lap by pushing the fibers apart and be caught therein once the latter has passed around the rollers.

The optimum tension is determined experimentally.

The particle dosage is obtained by a final squeeze-drying operation between the rollers 18 and 19, the roller 19 being contact pressed against the lap 1 by a force adjustable through a spring 20. An adjustable stop, not shown in FIG. 2, holds the gap between the rollers 18 and 19 as required for obtaining the desired dosage.

The level in the resin bath 26 is kept steady by the spill-way 21 and the particle dispersion maintained by continuous circulation using the pump 25 which takes up the over-spill dropping via the pipe 22 into a tub 23. An agitator 24 plunged into said tub 23 prevents any segregation and sedimentation of the resin particles.

Other modes of impregnation may be envisioned whereby, for example, the aqueous dispersion would be projected under pressure with an adjusted flow-rate against the fiber lap passing through a neck.

The lap 1 also be squeeze-dried using a flexible scraper in place of the roller 19.

B2. Resin in Dense Suspension in Air or a Neutral Gas (See FIG. 3)

Impregnation using a water based method as described above carries the drawback of then implying a drying operation on the fibers and particles before proceeding to the resin fusion phase.

A preferred variation of the invention consists of putting the particles in a dense suspension in air or a neutral gas, whereupon the lap passes through the resin bath as in the foregoing, i.e.:

The treated and dried lap 1 runs across the roller 14 into the mass of resin particles 27, fluidified by means of a current of air or neutral gas flowing through a porous wall 28 embodied in the bottom of a tub 29 containing the resin mass 27.

The substantially spheroid resin particles 27 are mechanically forced through the fibers by pressing the lap against the walls of the rollers 15,16 and 17, thereby trapping the particles between all the fibers and inducing natural electrostatic charges by friction which hold them in place on the surface.

Any excess particles thus fixed are eliminated by shaking the lap 1 leaving the tub 29 across the roller 18, and then pulled around the rollers 30,31 and 32.

Such shaking is carried out at adjustable frequency and amplitude by means of a vibrator 33, mounted on silent-blocks 34 imparting movement to the bars 35 which transmit the vibration to the lap.

The quantity of particles eliminated is dependent on the amplitude and frequency of this shaking action.

The particle bath 27 is replenished on an on-going basis via a hopper, not shown, and the level therein is held steady by means of an electronic gauge which monitors the resin feed from the hopper.

Various known devices complete the installation for the purposes of dessication and degreasing the air, as well as for preheating it to approximately 50° C. to rid the resin of any humidity.

The pre-heating temperature can be increased to a value just below the resin fusion point by employing a neutral gas in a closed circuit to avoid resin oxydation.

C. HEATING AND FUSION (see FIG. 4)

At the exit from the impregnation and dosing module, the fiber lap 1 comprising the exact quantity of resin particles for the desired glass fiber content is fed into an infra-red oven 36 with a wave length suited to the resin and adapted to the speed sought.

The temperature of the lap 1 is raised at various points and regulated by cueing the temperature of the oven 36 electronically.

In the case of variant B1 based on water, humidity evaporation from the lap 1, after squeeze drying, is achieved preferably using a microwave module or high-frequency dielectric loss methods, upstream of the fusion heating oven 36 described above.

The effectiveness of the heating is all the better if the lap is held spread out surface-wise throughout the entire period spent in the oven.

To obviate early surface fusion, the temperatures are set to reach the melting point only in the last part of the oven 36.

As fibers are located in the core of the lap 1, advantage is gained from preheating them prior to impregnation at a temperature slightly lower than the melting point of the resin, thereby procuring increased production speed together with improved fiber-resin adherence.

This preheating of the fibers can be coupled, for better efficiency, with thorough preheating of the resin, as implicated above, but in a non-oxidizing atmosphere to avoid deterioration of the resin.

When using conducting fibers such as carbon, there is advantage to be gained from utilizing the Joule effect to preheat the fibers. If the fibers do not have conducting qualities, as is the case for glass, the preheating is achieved either by infra-red methods, contact with heated rollers, microwaves or a combination of these means.

D. SIZING AND COOLING (SEE FIGS. 4 AND 5)

For efficiency reasons regarding the heating and melting means, the lap 1 is spread out as much as possible in the oven 36. It must therefore be gathered together once it leaves the oven 36 for it to be given the desired profile before it cools.

The fiber concentrating operation must take place without altering the parallelism thereof and without trapping any air or gas therein.

The procedure adopted consists of bringing together the impregnated fibers 1 in the groove 37a of a rotatable cylinder 37, equal in width to the profiled strip to be obtained. A second cylinder 38 including an annular protrusion 38a matched with the groove 37a of the cylinder 37 and in contact therewith under the effect of a spring 38b or an adjustable jack compresses the resin coated fibers 1 by continuous rolling which evacuates the air upstreamwards and gauges the cross-section of the profile with accuracy.

To avoid resin adherence on the walls of the culinders 37,38, said walls are cooled by water flow 39,40, regulated via an exchanger not shown.

This set up is completed downstream by a static smoother comprising a fixed base 41 and a movable element 42 in pressure contact with the profiled strip 1b under the effect of a jack 43. The elements 41 and 42 have the same profile as the cylinders 37 and 38 and are also cooled using flowing water at an adjustable temperature.

The smoother 41, 42 fulfils a double role. Firstly, it gives a smooth finish to the profiled strip 1b and secondly, it brings down the temperature of the resin below the melting point during sizing to avoid any shrinkage of the profiled strip 1b due to traction effects caused by the following module.

Cooling is then completed by passing the lap through a tunnel 44 in which there is a flow of cold air in the opposite direction (see arrow F).

Other means such as the spraying of water or feeding the profiled strip 1b through a water bath can be employed.

E. DRAWING AND COILING (SEE FIG. 6)

Upon leaving the cooling tunnel 44, the profiled strip 1b is pulled by a set of pulleys 45 and 46. The pulley 46 is movable and pushes against the pulley 45 by means of a spring or jack 47 to ensure adherence on the profiled strip. This adherence is improved by lining the pulleys 45, 46 with elastomer. A linear counter 48 measures the length of profiled strip 1b produced and a comparator 49, mounted upstream of the pulleys 45,46 continously measures the thickness of the profiled strip, providing thus a feedback to the resin dosing system described under phase B1 or B2 so as to adjust said thickness.

The speed at which the profiled strip 1b advances is chosen by the operator in terms of the products making up the profiled section and of the cross-section thereof. The tension of the lap 1 is independent of this speed and held at the chosen value thanks to the device described in phase A.

The profiled strip 1b is stored conventionally on a reel 53 by means of an assembly including a fixed pulley 50, an adjustable tensioning see-saw consisting of a pulley 51 and a counterweight 52. This see-saw controls a potentiometer acting on the rotational speed of the coil 53.

A pulley 54 equipped with an adjustable brake pad 55, gives the final tension and, via a worm-screw arrangement (not shown), distributes the profiled strip 1b over the width of the coil 53 that is driven by a variable-speed dc motor controlled as stipulated hereabove by the see-saw arrangement 51, 52, thereby enabling variations due to the change in diameter as the lap fills the coil to be absorbed.

The profiled strips obtained using the installation described in the foregoing are primarily intended for reinforcement wrapping round tubes of any description or tanks for increasing the service pressure thereof (French Pat. No. 80 20666 of 29/9/1980 on behalf of Spie-Batignolles).

Apart from E, R or S glass fibers, others that may be used comprise carbon, graphite, kevlar, aromatic polyamide, boron, asbestos, silicon carbide and generally speaking any continuous fiber having a softening point greater than the melting point of the resin.

As for the usable resins, these cover all thermoplastic resins that can be produced in fine particle form. The optional dimension for the particles is dependent, for a given profile, on the fiber diameter and on the resin to fiber cross-sectional ratio sought.

Besides the applications of this profiled strip to the reinforcement wrapping around cylindrical bodies, the following can be envisioned:

the manufacture of tubes by winding around a mandrel or a stiff inside membrane, the building up of flexible sheets of profiled strips side by side, where the sheets are then laid criss-cross on one another and melted together between press plates to form rigid multi-shaped panels (non-planar), the building up of braids of narrow profiled strips, melted together in moulds or heated dies, the construction of wide profiled strips by assembling several unit profiled strips in a heated die, the manufacture of moulded parts by extrusion or injection using these profiled strips cut into short lengths.

Use can also be made of thermo-setting resins in powder form or mixtures of thermoplastic and thermo-setting resins.

An example is set forth hereafter with numerical values illustrating the procedure in accordance with the invention.

INITIAL PRODUCTS

E type glass fibers 24 microns in diameter on two reels of 2400 tex obtained by direct coiling—multipurpose oiling for thermo-setting reins. Polyamide resin 6 in powder form, granulometry ranging from 5 to 25 microns, the average lying between 12 and 17 microns, with an addition of $5°/_{oo}$ black carbon to give an UV resistant product.

SETTINGS

Lap 1 tension set to: 125 g
Lap speed: 20 m/minute
Temperature of the glass after the epoxyphenolic treatment: 120° C.
Preheat of the resin: 45° C.
Temperature of the profiled section upon leaving the ovens: 240°–250° C.
Load on the dynamic former (rollers 37,38): 4800 g
Load on the static former (41,42): 2200 g
Temperature of the formers (water cooled)
 dynamic: 80° C.
 static: 60° C.

The profiled strip 1b obtained was 7.5 mm wide for a thickness of between 0.5 and 0.55 mm and a weight of 6.9 g/ml on average for 4.8 g/ml of glass, i.e. a ratio of 70%. The tension tests carried out longitudinally on specimen samples gave tensile strength values varying between 110 and 115 hb adjusted for a cross-section of 7.5×0.5 mm.

In the installation, the succession of the various modules is essential in the production of a resin-profiled section reinforced with unidirectional fibers, having a perfectly gauged cross-section and remarkable mechanical properties as a result of the high fiber content and the homogeneity of their distribution throughout the cross-section.

We claim:

1. A process for manufacturing thin profiled strips composed of continuous unidirectional fibers embedded in a thermoplastic resin, comprising the following successive steps:
    (a) dipping a lap (1) of parallel and equally-taut fibers in a bath (26, 27) of resin particles,
    (b) feeding the lap over rollers (15, 16, 17) immersed in said bath of resin particles,
    (c) exerting on the lap of fibers running over said rollers (15, 16, 17) immersed in the resin, a tension such that the resin particles trapped between the rollers and the lap can penetrate into the lap, by pushing the fibers apart from each other and be caught in the lap once the lap has passed around the rollers, while leaving in the lap resin particles in excess of a desired resin-to-fiber content ratio,
    (d) continuously vibrating the lap to remove said excess resin particles in the lap thereby to achieve said desired resin-to-fiber content ratio,
    (e) heating the lap loaded with particles to melt said resin particles, and
    (f) forming and cooling the obtained profiled strip.

2. A process according to claim 1, wherein the resin particles are substantially spheroidal.

3. A process according to claim 1, wherein after said resin melting, the lap loaded with melted resin is formed by pinch-passing it between cooled cylinders (37, 38).

4. A process according to claim 1, wherein the resin particles are in a state of dense suspension in a gas in the mechanical impregnation bath (27).

5. An installation for manufacturing thin profiled strips composed of continuous unidirectional fibers embedded in a thermoplastic resin, comprising:
    means for dipping a lap (1) of parallel and equally-taut fibers in a bath (26, 27) of resin particles,
    means for feeding the lap over rollers (15, 16, 17) immersed in said bath of resin particles,
    means for exerting on the lap of fibers running over said rollers (15, 16, 17) immersed in the resin, a tension such that the resin particles trapped between the rollers and the lap can penetrate into the lap, by pushing the fibers apart from each other and be caught in the lap once the lap has passed around the rollers, while leaving in the lap resin particles in excess of a desired resin-to-fiber content ratio,
    an agitator (33) adapted to vibrate continuously said lap at adjustable frequency and amplitude for removing said excess resin particles in the lap thereby to achieve said desired resin-to-fiber content ratio,
    means for heating the lap loaded with particles to melt said resin particles, and
    means for forming and cooling the obtained profiled strip.

6. An installation according to claim 5, further comprising means (11) for treating the surface of the fibers of the lap with a view to providing resin adherence therewith.

7. An installation in accordance with claim 5, wherein the means for forming the lap to the desired profile comprise two cooled cylinders (37, 38) in contact with the lap, one (37) of said cylinders comprising an annular groove (37a) whose cross-section matches the desired profile.

8. An installation in accordance with claim 5, wherein the means for forming the lap are followed by means (44) for cooling the profiled strip (1b) at variable speed independently of the lap tension and means for coiling and distributing the profiled section obtained under constant tension.

9. An installation in accordance with claim 5, wherein the means for forming the lap to the desired profile are followed by means (42, 43) for smoothing and cooling complementarily the surface of the profiled section at adjustable pressure and temperature values.

* * * * *